UNITED STATES PATENT OFFICE.

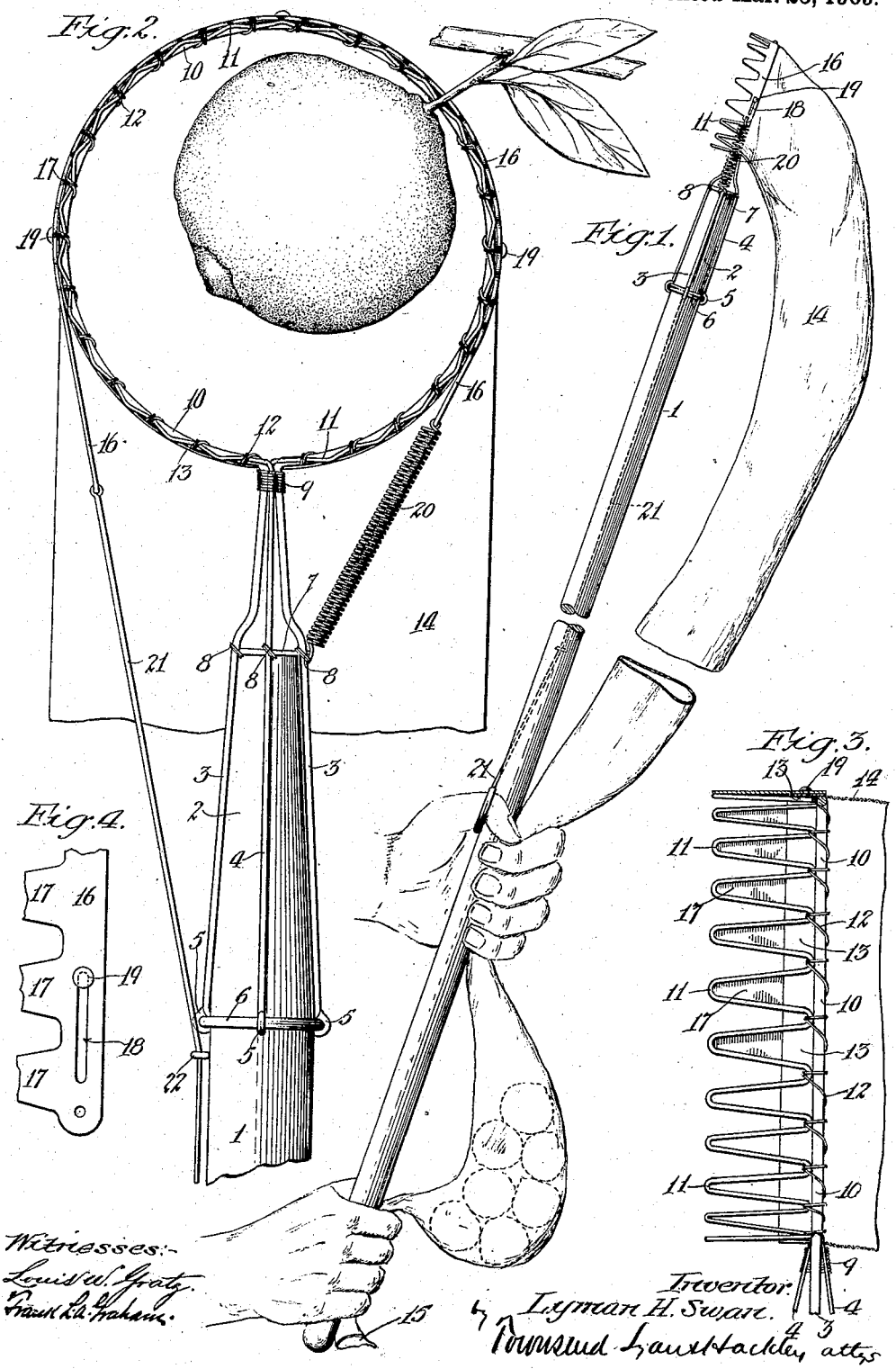

LYMAN H. SWAN, OF LOS ANGELES, CALIFORNIA.

FRUIT-PICKER.

No. 916,055.          Specification of Letters Patent.          Patented March 23, 1909.

Application filed July 6, 1908. Serial No. 442,193.

*To all whom it may concern:*

Be it known that I, LYMAN H. SWAN, a citizen of the United States, residing at Los Angeles, in the county of Los Angeles and State of California, have invented a new and useful Fruit-Picker, of which the following is a specification.

This invention relates to fruit pickers and has for its object to enable fruit to be picked while the operator stands on the ground, means being provided for preventing fruit which is picked from falling to the ground by conducting the fruit after it is picked into a receptacle which forms a part of the fruit picker. After an amount of fruit has accumulated in the said receptacle it may be discharged from the receptacle into the box or crate.

Fruit pickers have heretofore been devised which required that the cutter be exactly positioned with respect to the fruit and such careful manipulation requires considerable time.

A further object of the present invention is to provide a fruit picker which has a plurality of cutting devices or knives which are distributed so as to have a considerable compass so that the fruit picker does not have to be placed in any one particular position in picking a piece of fruit, thereby greatly economizing time, which is of prime importance in fruit gathering.

Referring to the drawings Figure 1 is a side elevation of the complete device contracted in length showing the manner in which it is held by the operator. Fig. 2 is an enlarged view, being a front elevation of the upper portion of the device. In this view a piece of fruit is shown to illustrate the relative position of the device to the fruit when in position for picking it. Fig. 3 is a side elevation on the same scale as Fig. 2 of the upper portion of the device, the greater part of the bag being removed. Fig. 4 is a side elevation on an enlarged scale of a portion of the cutting knife to illustrate one of the guiding devices therefor.

The fruit picker comprises a pole 1 having a tapered upper end 2 which is received in a socket formed of wires 3 and 4. As shown in Fig. 2 there are two wires 3, and as shown in Fig. 1 there are two wires 4. All of the wires 3 and 4 have eyes 5 at their lower ends through which a ring 6 passes, the latter serving to unite the wires and cause them to firmly clasp the pole 1. At the upper end of the pole 1 is a ring 7 arranged inside of the wires 3 and 4 and fastened to the wires by tie wires 8. The wires 3, as shown in Fig. 2, extend above the pole 1 and converge as do the wires 4, the four wires 3 and 4 being tied together at a point by a tie wire 9 which is wound with several turns around them. Above the binding wire 9 the two wires 3 are formed in a circle thus producing a wire ring 10. The wires 4 are bent or coiled to form a series of wire teeth 11, see Fig. 3. There is thus formed a circular band of wire teeth 11, which is substantially concentric to the wire ring 10, and the wire forming the teeth 11 is secured to the ring 10 by the fastening wire 12, which is wound around the ring 10 and around the inner loops of teeth 11 as shown in Figs. 2 and 3. The circular band of teeth 11 is slightly dished. In other words each tooth 11 is bent slightly outward so that the outer circumference of the band of teeth 11 is slightly greater than the inner circumference of the band of teeth which lies next the ring 10. For example, as shown in Fig. 3, it will be observed that the upper and lower teeth in this picker both have their outer ends bent outwardly.

Encircling the band of teeth 11 adjacent the ring 10 is a metal hoop 13, which hoop as shown in Fig. 3 covers the ring 10 and is of such width that it extends part way of the length of each tooth 11. The hoop 13 is divided at its lower portion to receive the two wires 3, the latter passing to the inner side of the hoop and lying against the inner face thereof. Between the hoop 13 and the ring 10 is secured the upper edge of a bag 14, the latter being of a length sufficient to reach substantially to the bottom of the pole 1 and being of a size to enable the fruit to readily pass through it, and the bag 14 is adapted to act not only as a conductor to guide the fruit from the picking device but to also act as a temporary receptacle for the fruit. The lower end 15 of the bag 14 is open, as shown in Fig. 1, but fruit is held from escaping by the operator's hand which holds the lower end of the bag tight against the pole and thus prevents fruit escaping from the bag until such time as it is desired to empty the bag.

Encircling a large portion of the ring of teeth 11 and lying against the outside face of the band 13 is a cutting knife 16 which preferably comprises a thin flexible steel band formed with teeth 17, the contour of the teeth 17 coinciding with the contour of the wire teeth 11 as indicated in Fig. 3. The cutting knife 16 is adapted to slide on the band 13 and is guided against lateral displacement by slots 18 through which rivets 19 project, the latter being secured to the band 13. Secured to one end of the cutting knife 16 is a coil spring 20, the lower end of the spring 20 being attached to one of the binding wires 8. Adjacent to the other end of the cutting knife 16 is a cord 21 which passes through an eye 22 on the pole 1 and extends down alongside the pole 1 so as to be within convenient reach of the hand of the operator. The cutting teeth extend substantially perpendicular to the plane of the circle of movement of the knife and this plane is substantially parallel to the supporting pole.

By pulling on the cord 21 the cutting knife is caused to slide circularly over the band 13 so that the teeth 17 are moved into or across the spaces between the wire teeth 11 and upon releasing the cord 21 the spring 20 contracts and restores the cutting knife to its normal position with the teeth 17 again in register with the wire teeth 11.

In use the device is held as indicated in Fig. 1, and the open mouth of the device is applied so as to partially receive the piece of fruit to be picked and the stem of the fruit is received between any of the wire teeth 11 according to the relative position of the fruit with respect to the picker. Obviously it is not necessary that the picker be guided to any particular point to cause the stem of the fruit to be received between any particular teeth. The operator then pulls the cord 21 which slides the cutting knife 16 and the tooth of the cutting knife which is adjacent the stem of the fruit slides forward and severs the stem, whereupon the fruit rolls down into the bag 14 and is arrested in the lower end thereof as indicated in Fig. 1. After a sufficient quantity has accumulated in the lower end of the bag the operator will carry the bag to the crate or box and release his hand from the bag, whereupon the fruit within the bag will roll out through the open lower end of the bag into the box or crate.

What I claim is—

1. A fruit picker comprising a wire bent to form teeth around the circumference of a circle, a flexible cutting knife concentric with said wire and formed with cutting teeth, a pole supporting said wire and knife, a cord adjacent to one end of the knife for sliding it, and a spring connected to the other end of the knife for restoring the knife, the teeth of said knife being substantially perpendicular to the plane of the circle in which the knife moves and said plane being substantially parallel to the supporting pole.

2. A fruit picker comprising a wire bent to form teeth around the circumference of a circle, a flexible cutting knife concentric with said wire and formed with cutting teeth, a pole supporting said wire and knife, a cord adjacent to one end of the knife for sliding it, a spring connected to the other end of the knife for restoring the knife, and a bag having its upper end held open adjacent said knife and wire to receive the fruit, the teeth of said knife being substantially perpendicular to the plane of the circle in which the knife moves and said plane being substantially parallel to the supporting pole.

3. A fruit picker comprising a wire bent to form teeth around the circumference of a circle, a flexible cutting knife concentric with said wire and formed with cutting teeth, a pole supporting said wire and knife, a cord adjacent to one end of the knife for sliding it, a spring connected to the other end of the knife for restoring the knife, and a bag having its upper end held open adjacent said knife and wire to receive the fruit, the lower end of said bag being open, the teeth of said knife being substantially perpendicular to the plane of the circle in which the knife moves and said plane being substantially parallel to the supporting pole.

4. A fruit picker comprising a wire bent to form teeth around the circumference of a circle, a flexible cutting knife concentric with said wire and formed with cutting teeth, a pole supporting said wire and knife, a cord adjacent to one end of the knife for sliding it, a spring connected to the other end of the knife for restoring the knife, and a hoop at the base of said cutting teeth and partially supporting said knife.

5. A fruit picker comprising a wire bent to form teeth around the circumference of a circle, a flexible cutting knife concentric with said wire and formed with cutting teeth, a pole supporting said wire and knife, a cord adjacent to one end of the knife for sliding it, a spring connected to the other end of the knife for restoring the knife, a hoop at the base of said cutting teeth and partially supporting said knife, said knife having slots, and studs projecting from said hoop through said slots for guiding the knife.

6. A fruit picker comprising a pole, a wire bent to form a ring above the pole, the lower ends of said wire extending along the pole and being secured thereto, another wire bent to form a ring concentric with the first ring and being bent laterally to form wire teeth, the latter toothed wire being secured to the first wire, the lower ends of the second wire extending along the upper end of the pole and being secured thereto, a hoop around the first wire and extending partially over the teeth of the second wire, a flexible metallic cutting knife slidable on said hoop, said knife being formed with teeth which substantially register with the wire teeth when the knife is in normal position, a cord secured to one end of said knife for sliding it in one direction said cord extending along the pole, and a spring secured to the other end of said knife for restoring the knife to normal position.

7. A fruit picker comprising a pole, a wire bent to form a ring above the pole, the lower ends of said wire extending along the pole and being secured thereto, another wire bent to form a ring concentric with the first ring and being bent laterally to form wire teeth, the latter toothed wire being secured to the first wire, the lower ends of the second wire extending along the upper end of the pole and being secured thereto, a hoop around the first wire and extending partially over the teeth of the second wire, a flexible metallic cutting knife slidable on said hoop said knife being formed with teeth which substantially register with the wire teeth when the knife is in normal position, a cord secured to one end of said knife for sliding it in one direction said cord extending along the pole, a spring secured to the other end of said knife for restoring the knife to normal position, a ring securing the lower ends of both said wires to an intermediate part of the pole, and another wire ring located at the upper end of the pole and securing said wires together, said wires being further secured together by a wire winding located close to the ring.

In testimony whereof, I have hereunto set my hand at Los Angeles, California, this 30th day of June 1908.

LYMAN H. SWAN.

In presence of—
G. T. HACKLEY,
FRANK L. A. GRAHAM.